(12) United States Patent
Povinelli et al.

(10) Patent No.: US 7,571,957 B2
(45) Date of Patent: Aug. 11, 2009

(54) COMPONENT INTEGRATION PANEL SYSTEM WITH CLOSED BOX SECTION

(75) Inventors: Anthony J. Povinelli, Romeo, MI (US); Gari M. Schalte, Oakland Township, MI (US); Michael W. Crane, Oakland Township, MI (US)

(73) Assignee: Magna International (CA)

( * ) Notice: Subject to any disclaimer, the term of this patent is extended or adjusted under 35 U.S.C. 154(b) by 0 days.

(21) Appl. No.: 11/701,252

(22) Filed: Feb. 1, 2007

(65) Prior Publication Data

US 2008/0185872 A1    Aug. 7, 2008

(51) Int. Cl.
B60J 7/00    (2006.01)
(52) U.S. Cl. .............................. 296/193.09; 296/203.02
(58) Field of Classification Search ............. 296/193.09
See application file for complete search history.

(56) References Cited

U.S. PATENT DOCUMENTS

| | | | | |
|---|---|---|---|---|
| 3,188,132 A * | 6/1965 | Schwiering et al. | ..... | 296/203.02 |
| 3,295,627 A * | 1/1967 | Fleck et al. | ............ | 296/193.09 |
| 4,141,426 A * | 2/1979 | Hamada et al. | ............ | 180/68.4 |
| 4,542,934 A * | 9/1985 | Komatsu et al. | ....... | 296/203.02 |
| 4,545,612 A * | 10/1985 | Harasaki | ................. | 296/203.02 |
| 4,560,198 A * | 12/1985 | Katano et al. | .......... | 296/203.02 |
| 4,573,734 A * | 3/1986 | Gass | ...................... | 296/187.09 |
| 4,719,704 A * | 1/1988 | Hogg | ......................... | 33/288 |
| 4,790,588 A * | 12/1988 | Corson | .................. | 296/203.02 |
| 4,822,096 A * | 4/1989 | Fujii | ..................... | 296/203.02 |
| 4,900,083 A * | 2/1990 | Kumasaka et al. | ..... | 296/203.02 |
| 4,909,565 A * | 3/1990 | Harasaki et al. | ........ | 296/187.09 |
| 4,940,281 A * | 7/1990 | Komatsu | ................ | 296/193.09 |
| 4,955,663 A * | 9/1990 | Imura | ..................... | 296/203.02 |
| 5,098,765 A * | 3/1992 | Bien | ..................... | 296/187.01 |
| 5,106,148 A * | 4/1992 | Ikeda et al. | ............. | 296/203.02 |
| 5,348,114 A * | 9/1994 | Yamauchi | ............... | 296/203.02 |
| 5,573,299 A * | 11/1996 | Masuda | .................. | 296/193.09 |
| 5,597,198 A * | 1/1997 | Takanishi et al. | ....... | 296/193.09 |
| 5,658,041 A * | 8/1997 | Girardot et al. | ......... | 296/193.09 |
| 5,823,602 A | 10/1998 | Kelman et al. | | |
| 6,073,987 A | 6/2000 | Lindberg et al. | | |
| 6,086,144 A * | 7/2000 | Kuwano | ...................... | 296/192 |
| 6,168,226 B1 * | 1/2001 | Wycech | .................. | 296/203.03 |
| 6,170,906 B1 * | 1/2001 | Kasuga | ................... | 296/203.02 |
| 6,196,624 B1 * | 3/2001 | Bierjon et al. | ......... | 296/193.09 |
| 6,216,810 B1 * | 4/2001 | Nakai et al. | ............ | 296/193.09 |
| 6,250,710 B1 * | 6/2001 | Matsuzaki | ............. | 296/203.02 |
| 6,273,496 B1 * | 8/2001 | Guyomard et al. | ..... | 296/193.09 |
| 6,290,287 B1 * | 9/2001 | Guyomard | ............. | 296/193.09 |
| 6,302,478 B1 * | 10/2001 | Jaekel et al. | ........... | 296/203.04 |

(Continued)

*Primary Examiner*—Kiran B. Patel
(74) *Attorney, Agent, or Firm*—Warn Partners, P.C.; Marc Luddy

(57) ABSTRACT

A carrier for improving the strength of the front end of a vehicle, the carrier having an upper cross member which incorporates a closed box section, a composite integration panel connected to the upper cross member, and a lower cross member which also has a closed box section and is also connected to the composite integration panel. The closed box section of the upper cross member, and the closed box section of the lower cross member allow the component integration panel to be attached to the front end of a motor vehicle for supporting various vehicle components. The carrier improves strength and rigidity, as well as provides support for any particular vehicle component which needs to be attached to the front end.

8 Claims, 4 Drawing Sheets

U.S. PATENT DOCUMENTS

| | | | |
|---|---|---|---|
| 6,382,709 B1* | 5/2002 | Chirifu et al. | 296/193.1 |
| 6,412,855 B1* | 7/2002 | Cantineau et al. | 296/193.09 |
| 6,416,119 B1* | 7/2002 | Gericke et al. | 296/205 |
| 6,438,842 B1* | 8/2002 | Raami | 29/897.2 |
| 6,450,276 B1* | 9/2002 | Latcau | 296/203.02 |
| 6,523,886 B2* | 2/2003 | Hoffner et al. | 296/203.02 |
| 6,533,348 B1* | 3/2003 | Jaekel et al. | 296/203.04 |
| 6,622,808 B2* | 9/2003 | Sasano et al. | 180/68.3 |
| 6,672,652 B2* | 1/2004 | Takeuchi et al. | 296/193.09 |
| 6,679,545 B1* | 1/2004 | Balzer et al. | 296/193.09 |
| 6,681,876 B1* | 1/2004 | Haneda et al. | 180/68.4 |
| 6,685,258 B2* | 2/2004 | Brogly et al. | 296/193.09 |
| 6,705,667 B1* | 3/2004 | Bartesch et al. | 296/203.02 |
| 6,715,573 B2* | 4/2004 | Emori et al. | 296/203.02 |
| 6,729,424 B2* | 5/2004 | Joutaki et al. | 296/203.02 |
| 6,729,681 B2* | 5/2004 | Yustick | 296/193.01 |
| 6,769,733 B2* | 8/2004 | Seksaria et al. | 296/203.02 |
| 6,796,604 B2* | 9/2004 | Igura et al. | 296/193.03 |
| 6,877,797 B2* | 4/2005 | Henderson et al. | 296/203.02 |
| 6,883,589 B2* | 4/2005 | Ozawa et al. | 165/41 |
| 6,979,053 B2* | 12/2005 | Kim | 296/193.09 |
| 7,073,848 B2* | 7/2006 | Lee | 296/193.09 |
| 7,117,926 B2* | 10/2006 | Mori et al. | 180/68.4 |
| 7,210,733 B2* | 5/2007 | Mouch et al. | 296/203.02 |
| 7,258,385 B2* | 8/2007 | Andre et al. | 296/64 |
| 7,287,613 B2* | 10/2007 | Kim | 180/68.4 |
| 7,296,824 B2* | 11/2007 | Yasui et al. | 296/203.02 |
| 7,331,413 B2* | 2/2008 | Okai et al. | 296/193.09 |
| 7,347,489 B2* | 3/2008 | Ziaja et al. | 296/193.09 |
| 7,350,609 B2* | 4/2008 | Udo et al. | 296/203.02 |
| 2002/0070062 A1* | 6/2002 | Joutaki et al. | 180/68.4 |
| 2004/0089769 A1* | 5/2004 | Carrier et al. | 248/71 |
| 2004/0188155 A1* | 9/2004 | Fujieda | 180/68.4 |
| 2006/0072008 A1* | 4/2006 | Miyazaki et al. | 348/118 |
| 2007/0138835 A1* | 6/2007 | Kapadia et al. | 296/193.09 |
| 2007/0252412 A1* | 11/2007 | Yatsuda | 296/193.09 |

* cited by examiner

COMPONENT INTEGRATION PANEL SYSTEM WITH CLOSED BOX SECTION

FIELD OF THE INVENTION

The present invention relates to a component that will complete a vehicle's front end structure while providing component integration and attachment features.

BACKGROUND OF THE INVENTION

There are many components that are attached to the front end of a motor vehicle. Objects such as headlamps, turn signals, and a grille, are all connected to the front end of a vehicle through various methods. Additionally, there are mechanical components underneath the hood of the vehicle that are also connected to the front end of the vehicle such as the radiator, wiring harnesses, and even a washer fluid or coolant overflow container. Often, these various vehicle devices are connected to a single component which is mounted onto to the vehicle frame. Conventional methods of producing this component utilize stamped steel box sections in conjunction with plastic to complete what is called a steel section or structure. This approach gives greater design flexibility, but lacks structure for high load applications, such as use with body on frame vehicles. The term "body on frame" is defined as the vehicle body and the frame of the vehicle being designed as two separate components which are assembled together during the manufacturing process. The frame of the vehicle is typically very rigid and provides for a solid structure on which various vehicle components, such various body panels, or the engine, can be mounted. Also, the frame often has higher impact requirements, as well as other more stringent design requirements. A second type of frame which is also very common and used in a vehicle is called a "unibody". This type of frame is an integration of the body and the frame of the vehicle into a single component.

The type of structure utilized for supporting all the components that are attached to the front end of a vehicle often does not meet the desired requirements for vehicles that have a frame which is separate from the body. Accordingly, there exists a need for an improved structure which allows for greater design flexibility when supporting the components that are attached to the front end of a vehicle.

SUMMARY OF THE INVENTION

The present invention is directed to a carrier which allows for improved structure and support of the front end of a motor vehicle as well as having the ability to support all the various vehicle components. The present invention is a carrier for improving the strength of the front end of a vehicle having an upper cross member which incorporates a closed box section, a composite integration panel connected to the upper cross member, and a lower cross member which also has a closed box section and is also connected to the composite integration panel. The closed box section of the upper cross member, and the closed box section of the lower cross member allow the component integration panel to be attached to the front end of a motor vehicle for supporting various vehicle components. The carrier improves strength and rigidity, as well as provides support for any particular vehicle component which needs to be attached to the front end.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
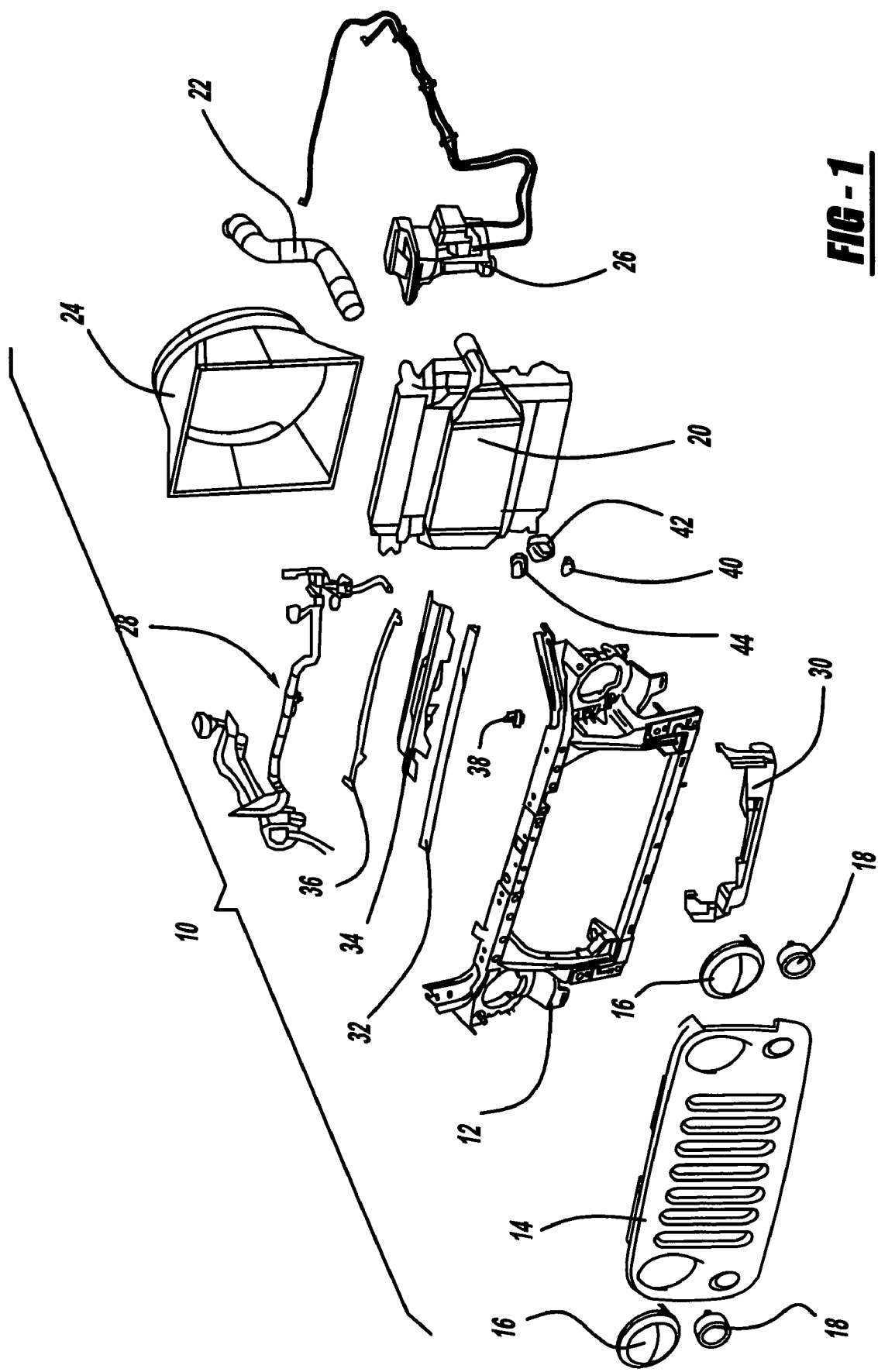
FIG. 1 is an exploded view of the front end of a motor vehicle incorporating a carrier according to the present invention.

The front end assembly of a motor vehicle incorporating a carrier according to the present invention is shown in FIG. 1 generally at 10. The carrier 12 is able to support various vehicle components. In FIG. 1, the carrier 12 is able to support a grille 14, headlights 16, turn signal lights 18, a radiator 20 which has a radiator hose 22, a radiator fan shroud 24, washer fluid bottle 26, a wiring harness 28, a lower air seal 30, a hood seal 32, an upper air seal 34, a prop rod 36, a temperature sensor 38, an airbag sensor 40, a horn 42, and a relay 44.

Figure 2:
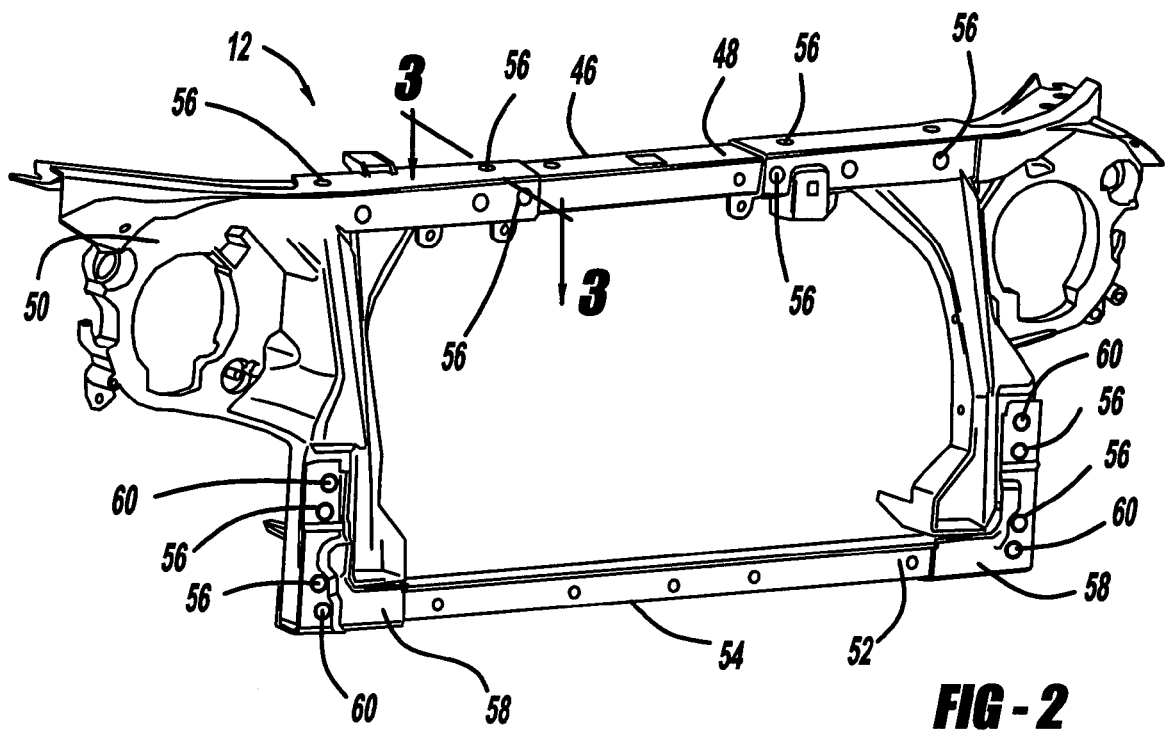
FIG. 2 is a first front perspective view of a carrier according to the present invention.

Referring now to FIG. 2, the carrier 12 has an upper cross-member 46 having a closed box section 48. The upper cross-member 46 is connected to a composite integration panel 50. Also connected to the composite integration panel 50 is a lower cross-member 52, which also includes a closed box section 54.

The upper cross-member 46 can be connected to the composite integration panel 50 through the use of conventional fastening methods, such as bonding or riveting. In this embodiment, the upper cross-member 46 is connected to the composite integration panel 50 through the use of bonds and rivets 56. The upper cross-member 46 is bonded to the composite integration panel 50 first, and the rivets 56 are then used to hold the upper cross-member 46 and the composite integration panel 50 together while the bond cures. The lower cross-member 52 is connected to the composite integration panel 50 through the use of mounting plates 58. The mounting plates 58 are welded to the lower cross-member 52, and the mounting plates 58 are connected to the composite integration panel 50 through the use of conventional rivets 60. Once again, other conventional fastening methods may be used, such as bonding or a nut and bolt, instead of the rivet 60.

The upper cross-member 46, the lower cross-member 52, and the composite integration panel 50 all have various apertures and recesses which can be used to connect the carrier 12 to the front end of a motor vehicle incorporating a "body on frame design." Vehicles having a body on frame design utilize a frame which is a separate component from the body of the vehicle, as opposed to vehicles incorporating a unibody design in which the body and the frame are incorporated into a single structure. The carrier 12 is connected to the frame of a vehicle, and the closed box section 48 of the upper cross-member 46 and the closed box section 54 of the lower cross-member 52 provide increased strength and rigidity to the carrier 12, allowing the carrier to support the various components of the vehicle shown in FIG. 1, as well as increase the overall strength of a vehicle frame.

Also, the upper cross-member 46 and the lower cross-member 52 are manufactured through a forming process. This allows the shape of the upper cross-member 46 and the lower cross-member 52 to be altered to allow both the upper cross-member 46 and the lower cross-member 52 to be connected to any type of vehicle frame.

Figure 3:
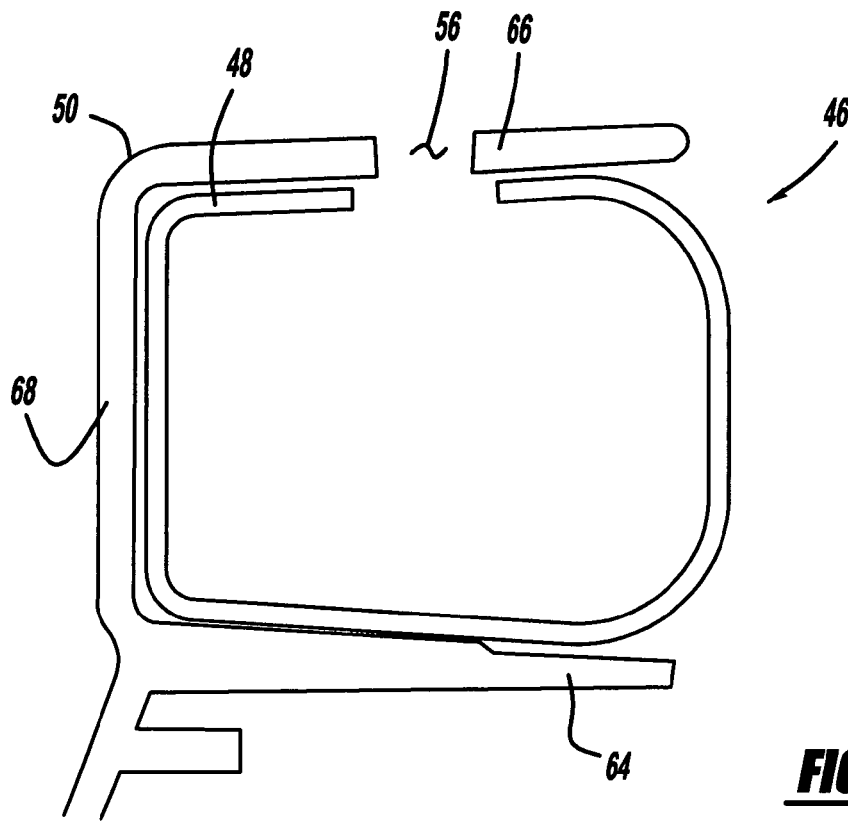
FIG. 3 is a sectional side view of an upper cross member having steel closed box section and a component integration panel according to the present invention.
Figure 4:
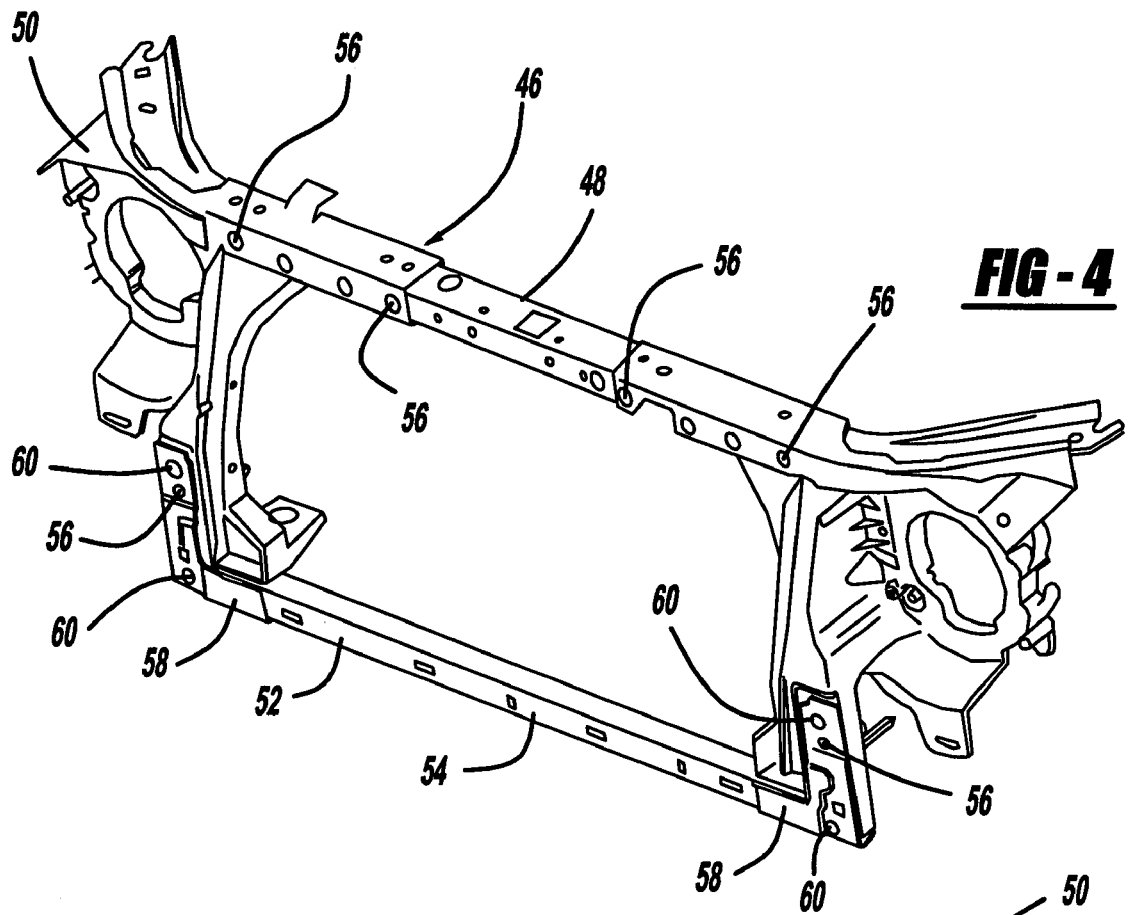
FIG. 4 is a second front perspective view of a carrier according to the present invention.
Figure 5:
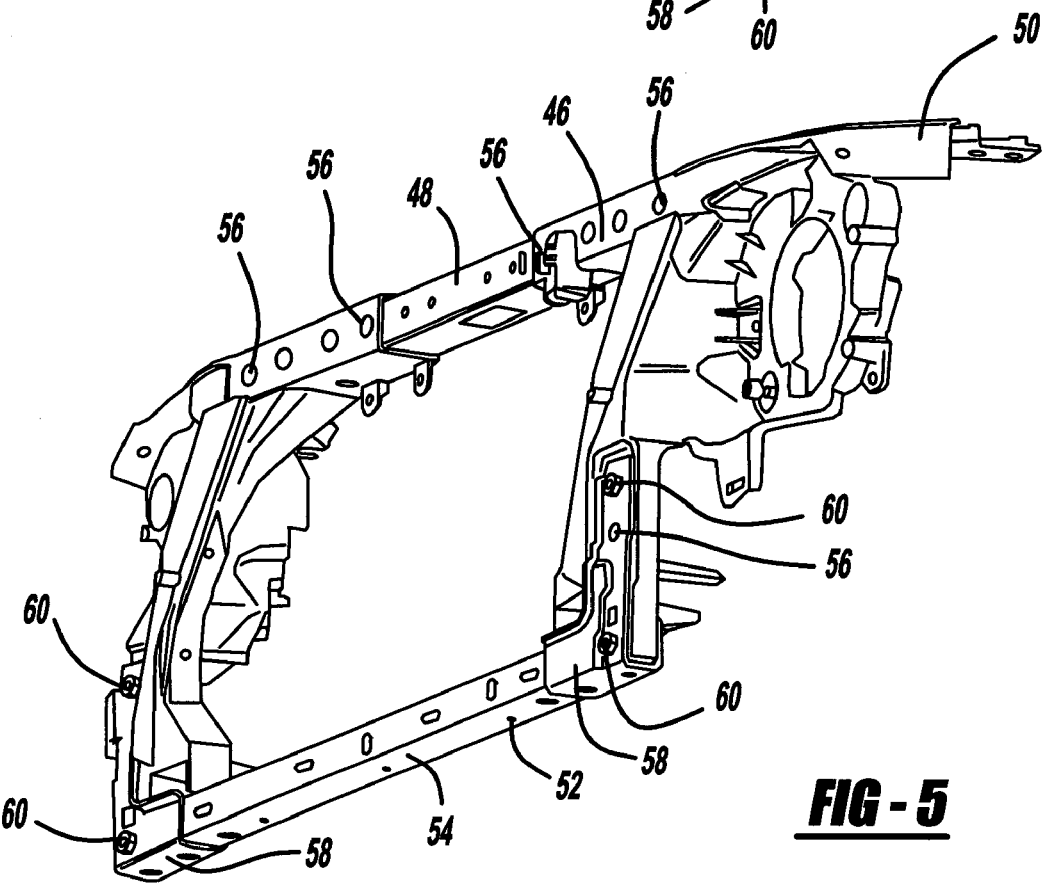
FIG. 5 is a third front perspective view of a carrier according to the present invention.
Figure 6:
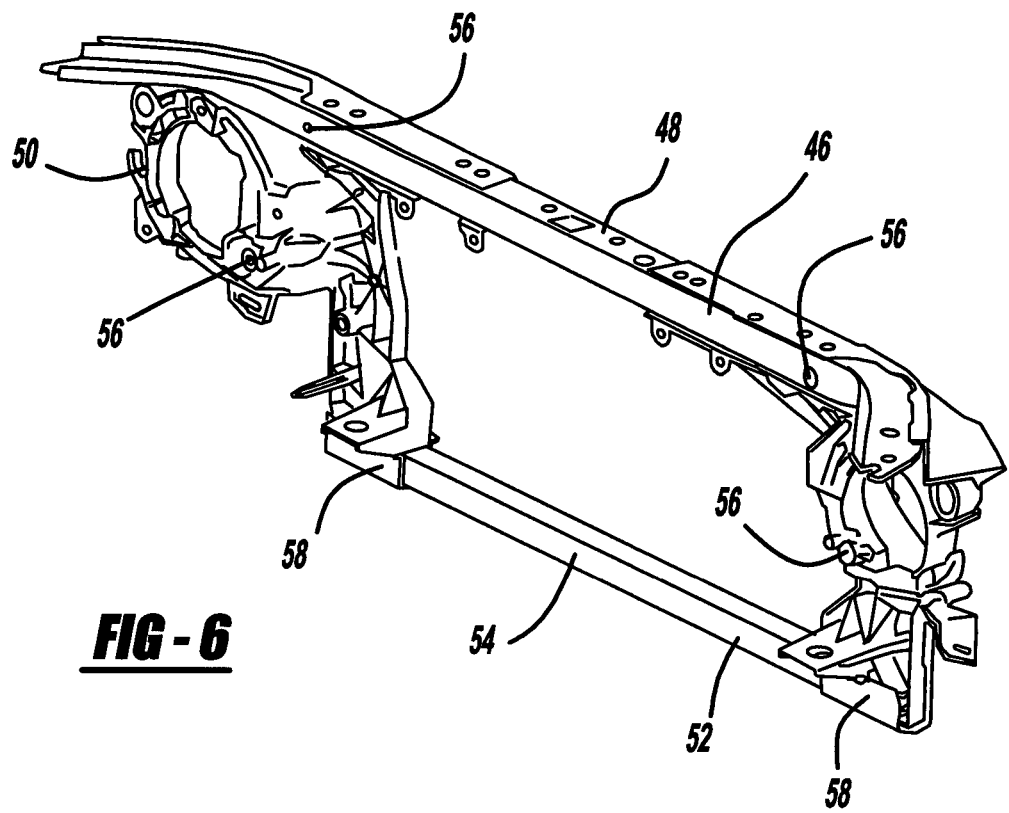
FIG. 6 is a first perspective rear view of a carrier according to the present invention.
Figure 7:
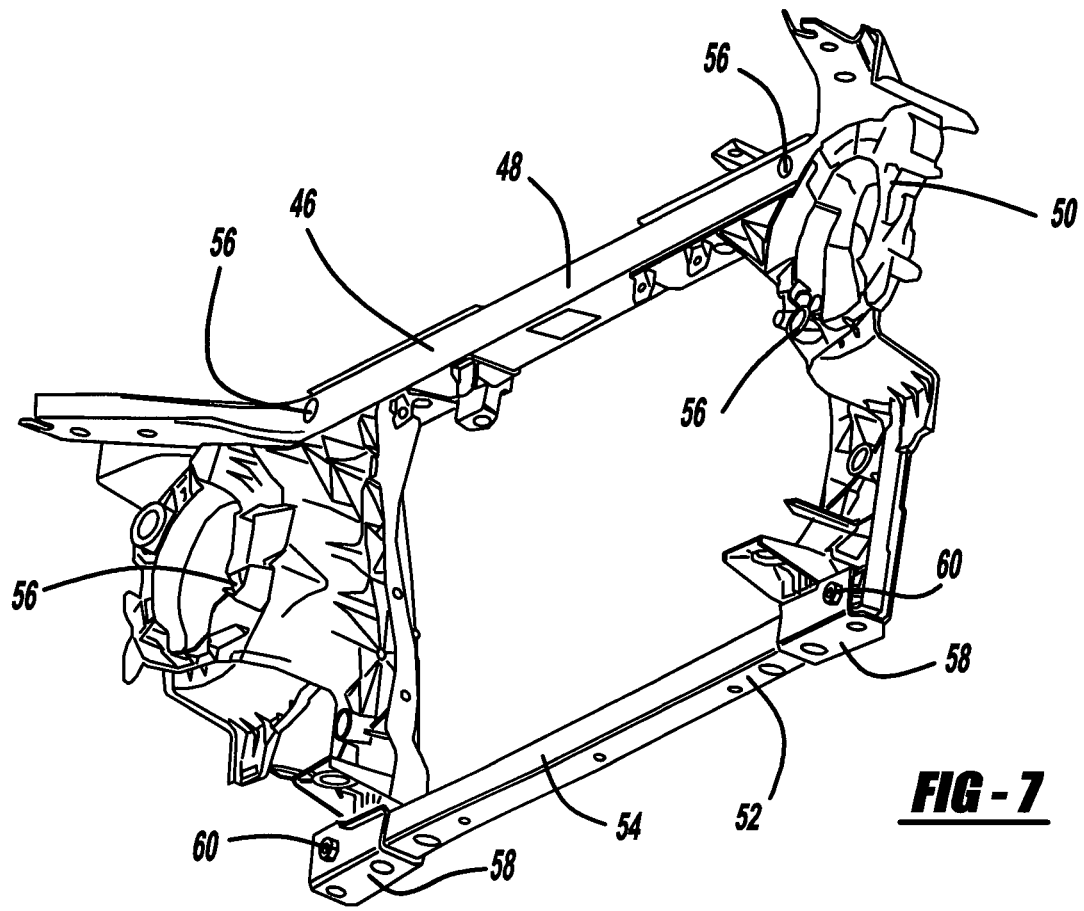
FIG. 7 is a second perspective rear view of a carrier according to the present invention.

To also aid in making the carrier 12 adaptable for different types of vehicle frames, the composite integration panel 50 is made of a thermoplastic material, which can be molded to be incorporated with an upper cross-member 46 or lower cross-member 52 of any shape or size. The composite integration panel 50 can also be an open C-section or L-section utilized in conjunction with the upper cross-member 46 and the lower cross-member 52. Referring to FIG. 3, the composite integration panel 50 is in the form of a C-section, having a lower panel 64, an upper panel 66, and a side panel 68. The lower panel 64, upper panel 66, and side panel 68 generally form the C-section; this C-section is along both sections of the composite integration panel 50 which receive the upper cross-member 46 and lower cross-member 52. In FIG. 3, the C-shape of the composite integration panel 50 receives the closed box section 48 of the upper cross-member 46.

As previously stated, the composite integration panel 50 could also be in the form of an L-section. This L-section is formed in a similar manner to the C-section shown in FIG. 3, with the exception that the upper panel 66, or lower panel 64, is removed, and the lower panel 64 and side panel 68 remain to form the L-section.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A carrier for improving the strength of the front end of a motor vehicle, comprising:

an upper cross-member having a closed box section;

a composite integration panel having an open section, a portion of said open section being connected to and at least partially surrounding said closed box section of said upper cross-member;

a lower cross-member having a closed box section, wherein a portion of said open section of said composite integration panel is connected to and at least partially surrounds said closed box section of said lower cross-member; and wherein said closed box section of said upper cross-member and said closed box section of said lower cross-member allow said composite integration panel to be attached to the front end of a motor vehicle for supporting various vehicle components.

2. A carrier according to claim 1, wherein said open section of said composite integration panel is an open C-section having an upper panel, a lower panel, and a side panel, with said side panel connecting said lower panel and upper panel.

3. A carrier according to claim 1, wherein said open section of said composite integration panel is an open L-section having a lower panel and a side panel, said lower panel connected to said side panel.

4. A carrier according to claim 1, wherein said open section of said composite integration panel is an open L-section having an upper panel and a side panel, said upper panel connected to said side panel.

5. A carrier according to claim 1, wherein the cross-section of said closed box section of said upper cross-member and the cross-section of said upper box section of said lower cross-member provide additional structural rigidity to said carrier.

6. A carrier according to claim 1, wherein said upper cross-member is manufactured to allow said carrier to be connected to any vehicle having a frame as a separate component from the vehicle body.

7. A carrier according to claim 1, wherein said lower cross-member is manufactured to allow said carrier to be connected to any vehicle having a frame as a separate component from the vehicle body.

8. A carrier according to claim 1, wherein said composite integration panel is manufactured such that said composite integration panel is suitable to be connected to any vehicle having a frame as a separate component from the vehicle body.

\* \* \* \* \*